(12) United States Patent
Deters

(10) Patent No.: US 10,399,525 B2
(45) Date of Patent: Sep. 3, 2019

(54) SYSTEM AND METHOD FOR PROTECTING OCCUPANTS OF A VEHICLE

(71) Applicant: Ford Global Technologies, LLC, Dearborn, MI (US)

(72) Inventor: Ralf Heinrich Deters, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 15/609,409

(22) Filed: May 31, 2017

(65) Prior Publication Data
US 2017/0349128 A1    Dec. 7, 2017

(30) Foreign Application Priority Data
Jun. 1, 2016    (DE) .......................... 10 2016 209 527

(51) Int. Cl.
*B60R 22/00*    (2006.01)
*B60R 21/0136*    (2006.01)
(Continued)

(52) U.S. Cl.
CPC ........ *B60R 21/0136* (2013.01); *B60N 2/0276* (2013.01); *B60R 21/013* (2013.01);
(Continued)

(58) Field of Classification Search
CPC . B60R 21/0136; B60R 21/013; B60R 21/015; B60R 2021/01252;
(Continued)

(56) References Cited

U.S. PATENT DOCUMENTS 6,296,273 B1 *    10/2001    Lewallen .......... B60R 21/01564
                                                        280/735
6,359,553 B1 *    3/2002    Kopischke ............. B60Q 9/008
                                                        180/169
(Continued)

FOREIGN PATENT DOCUMENTS

DE        19747708        3/1999
DE        102012022822 A1    8/2013

OTHER PUBLICATIONS

DE Search Report.
German Search Report DE 10 2016 209 527.7 Filed Nov. 3, 2016. 8 pages.

*Primary Examiner* — Shardul D Patel
(74) *Attorney, Agent, or Firm* — Frank MacKenzie; Brooks Kushman P.C.

(57) ABSTRACT

A protective system for a motor vehicle with automatic electrical seat position control and/or automatic electrical steering wheel adjustment is provided. The protective system includes a seat position control unit, a steering wheel adjustment control unit, an accident detection device and a communications connection. The seat position control unit is deactivates the automatic electrical seat position control. The steering wheel adjustment control unit is deactivates the automatic electrical steering wheel adjustment. The accident detection device detects a traffic accident of the motor vehicle. The communications connection connects the accident detection device to the seat position control unit and/or the steering wheel adjustment control unit. The accident detection device outputs at least one accident signal to the communications connection in the event of the detection of a traffic accident of the motor vehicle.

18 Claims, 1 Drawing Sheet

(51) Int. Cl.
*B60N 2/02* (2006.01)
*B60R 21/015* (2006.01)
*B62D 1/181* (2006.01)
*B62D 1/19* (2006.01)
*B60R 21/013* (2006.01)
*B60R 21/00* (2006.01)
*B60R 21/01* (2006.01)
*B62D 1/04* (2006.01)

(52) U.S. Cl.
CPC ............ *B60R 21/015* (2013.01); *B62D 1/181* (2013.01); *B62D 1/197* (2013.01); *B60R 2021/0027* (2013.01); *B60R 2021/01013* (2013.01); *B60R 2021/01061* (2013.01); *B60R 2021/01252* (2013.01); *B60R 2021/01286* (2013.01); *B62D 1/04* (2013.01)

(58) Field of Classification Search
CPC B60R 2021/01013; B60R 2021/01061; B60R 2021/01286; B60R 2021/0027; B62D 1/197; B62D 1/181; B62D 1/04; B60N 2/0276
USPC ...... 701/45, 49, 400; 180/169, 268; 280/735
See application file for complete search history.

(56) References Cited

U.S. PATENT DOCUMENTS

| | | | |
|---|---|---|---|
| 7,503,580 B2* | 3/2009 | Munch | B60R 21/01564 280/735 |
| 7,565,242 B2* | 7/2009 | Lucas | B60R 21/0134 701/300 |
| 2004/0216939 A1* | 11/2004 | Lorenz | B60R 21/015 180/268 |
| 2008/0162002 A1* | 7/2008 | Bacher | B60N 2/0232 701/45 |
| 2014/0319895 A1* | 10/2014 | Lange-Mao | B60N 2/002 297/463.1 |
| 2015/0330111 A1* | 11/2015 | Dente | B60L 58/12 701/49 |
| 2016/0176322 A1* | 6/2016 | Frommann | B60N 2/42709 701/45 |

* cited by examiner

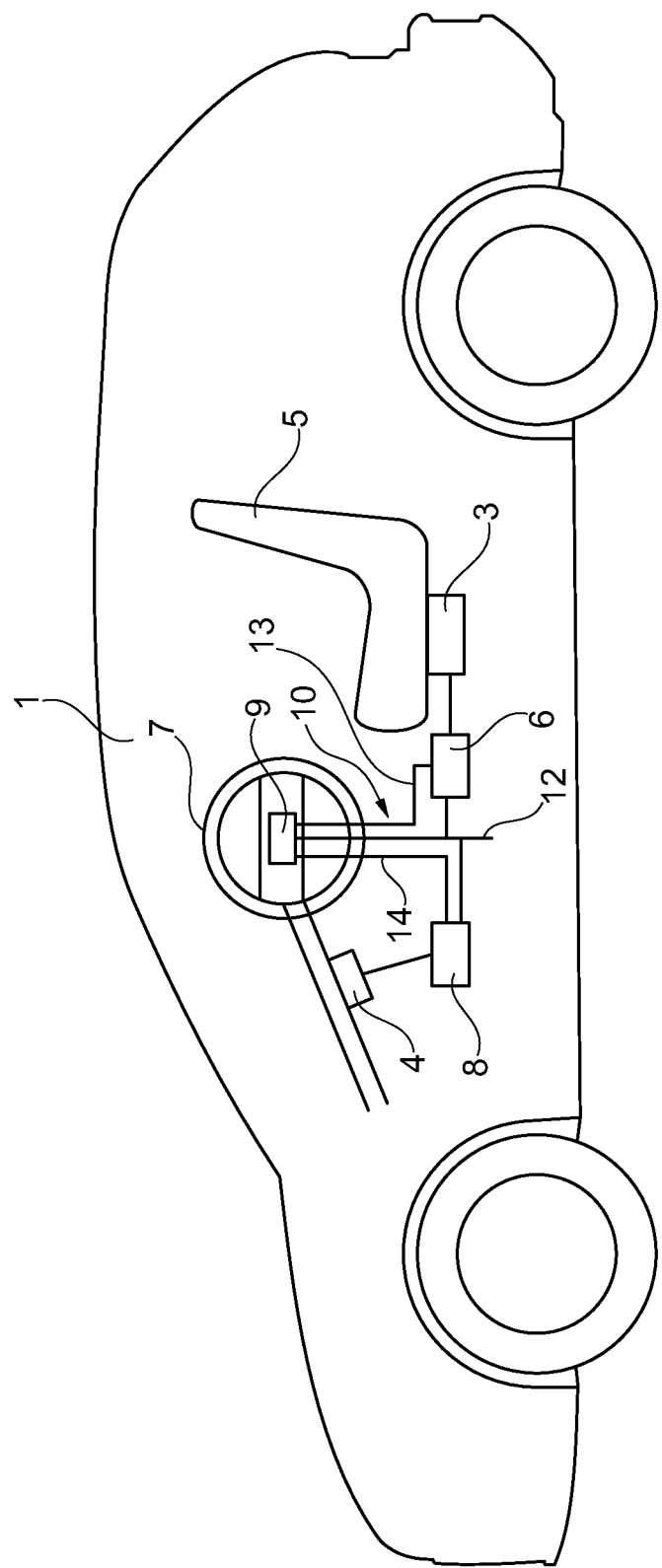

SYSTEM AND METHOD FOR PROTECTING OCCUPANTS OF A VEHICLE

CROSS-REFERENCE TO RELATED APPLICATIONS

This application claims foreign priority benefits under 35 U.S.C. § 119(a)-(d) to DE Application 10 2016 209 527.7 filed Jun. 1, 2016, which is hereby incorporated by reference in its entirety.

TECHNICAL FIELD

The disclosure concerns a method and system for protecting occupants of a motor vehicle.

BACKGROUND

Because of a traffic accident, a driver of a motor vehicle can be trapped, so that rescue forces have to free the driver of a motor vehicle from the motor vehicle. Previously however, the ignition of the vehicle is deactivated and the motor vehicle battery may be isolated or disconnected to ensure that an airbag, which is not triggered by the accident, does not trigger and injure the rescue forces during the rescue work.

However, seat position controls for adjusting a seat position of seats with electrical adjustment facilities, and, likewise, steering wheel adjustment devices for adjusting a steering wheel position are arranged to provide the driver a maximum space for exiting when deactivating the ignition, and, therefore, move automatically to a preset position. This may displace the driver of the motor vehicle that is still safety-belted or displaced between the seat and the steering wheel.

SUMMARY

It is an object of the disclosure to provide a method and a device for protecting the occupants of a motor vehicle.

The method according to the disclosure includes a seat position control unit for automatic electrical seat position control and/or a steering wheel adjustment control unit for automatic electrical steering wheel adjustment. The method includes: receiving an accident signal by the seat position control unit and/or the steering wheel adjustment control unit. The method also includes deactivating the automatic electrical seat position control by the seat position control unit and/or the automatic electrical steering wheel adjustment by the steering wheel adjustment control unit in response to the reception of the accident signal by the seat position control unit, or the reception of the accident signal by the steering wheel adjustment control unit.

As an accident signal, a bus signal on a bus of the motor vehicle that is connected to the seat position control unit and/or the steering wheel adjustment control unit can be used. The bus signal can be a signal that for example is fed into a CAN ("Controller Area Network") bus in order to deactivate particularly safety-relevant components of the motor vehicle, such as for example an engine control unit (also PCM—powertrain control module), which deactivates a fuel pump or a high voltage system in response to the accident signal. Such a signal for the CAN bus is typically provided nowadays by an airbag module or a connected sensor arrangement. In the event of an accident, a signal that is already currently present on the CAN bus can thereby be used, so that the method can be implemented in a motor vehicle at particularly low cost.

In addition or alternatively, an ENS signal ("Event Notification Signal") can be transmitted as an accident signal to the seat position control unit and/or to the steering wheel adjustment control unit via an individually associated line. In this case, a previously non-existent ENS connection to the seat position control unit is, therefore, to be installed in the motor vehicle.

It is particularly advantageous if as an accident signal both a bus signal is sent via a bus, such as for example the CAN bus, and an ENS signal is sent via an individually associated line, because as a result there is a redundancy, which increases safety.

The automatic electrical seat position control can be deactivated by the seat position control unit if no signal is received via the bus or the individually associated line. Accordingly, the automatic electrical steering wheel adjustment can be deactivated by the steering wheel adjustment control unit if no signal is received via the bus or the individually associated line. In the event of damage to the bus or ENS lines by the traffic accident, this enables further safe and manual movement of the seat or of the steering wheel to be guaranteed.

Moreover, the automatic electrical seat position control can be deactivated by the seat position control unit if signals that cannot be identified by the seat position control unit are received. Accordingly, the automatic electrical steering wheel adjustment can be deactivated by the steering wheel adjustment control unit if signals that cannot be identified by the steering wheel adjustment control unit are received.

With the method according to the disclosure, the seat position control arrangement and/or the steering wheel adjustment device controlling the respective preset positions thereof in the event of deactivation of the ignition following a traffic accident is/are prevented with simple means. There is thus no longer any danger of consequential injuries by approaching the preset position. The manual movement of the seat and of the steering wheel remain unaffected by said control. Thus, it is always still possible for the rescue forces, for example, by manually operating control switches of the seat position control and/or steering wheel adjustment device, to change the seat position and/or the steering wheel adjustment.

A protective system according to the disclosure for protecting the occupants of a motor vehicle with automatic electrical seat position control and/or automatic electrical steering wheel adjustment against consequential injuries following a traffic accident includes a seat position control unit, an accident detection device and a communications connection. The seat position control unit is configured to control automatic electrical seat position and/or a steering wheel adjustment control unit for automatic electrical steering wheel adjustment. The accident detection device is configured to detect a traffic accident of the motor vehicle. The communications connection within the motor vehicle connects the accident detection device to the seat position control unit and/or the steering wheel adjustment control unit. The communications connection can comprise a bus and/or an individually associated line to the seat position control unit and/or an individually associated line to the steering wheel adjustment control unit.

The accident detection device is designed in this case to output at least one accident signal via the communications connection in the event of the detection of a traffic accident of the motor vehicle. Moreover, the seat position control unit is designed to deactivate the automatic electrical seat position control, and/or the steering wheel adjustment control unit is designed to deactivate the automatic electrical steering wheel adjustment on receiving the accident signal.

The protective system according to the disclosure enables the method according to the disclosure to be carried out, and thereby enables the advantages described with reference to the method according to the disclosure to be achieved in a motor vehicle.

Besides this, a seat position control unit is provided that is designed to deactivate the automatic electrical seat position control on receiving an accident signal indicating a traffic accident of the motor vehicle, and a computer program product is provided comprising software components for operating such a seat position control unit.

Furthermore, a steering wheel adjustment control unit is provided that is designed to deactivate the automatic electrical steering wheel adjustment on receiving an accident signal indicating a traffic accident of the motor vehicle and a computer program product is provided comprising software components for operating such a steering wheel adjustment device.

Further features, properties and advantages of the disclosure result from the following description of an exemplary embodiment with reference to the accompanying FIGURE.

BRIEF DESCRIPTION OF THE DRAWINGS

The FIGURE shows a highly schematic representation of a motor vehicle with a protective system for preventing consequential injuries in the event of a traffic accident.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A motor vehicle 1 with automatic electrical seat position control and/or automatic electrical steering wheel adjustment as well as with a protective system for protecting occupants of the motor vehicle 1 by automatic adjustment of the seat position and/or automatic adjustment of the steering wheel is represented in the FIGURE. The motor vehicle 1 can be in the form of an automobile as shown in the FIGURE. It is also possible for it to be in the form of a commercial vehicle, however.

In the present exemplary embodiment, the motor vehicle 1 is fitted with a seat position adjustment device 3 for electrically controlled and automatic adjustment of a vehicle seat 5. and a steering wheel adjustment device 4 for electrically controlled and automatic adjustment of the steering wheel 7. A seat position control unit 6 for automatic seat position control is associated with the seat position adjustment device 3, and a steering wheel adjustment control unit 8 for automatic steering wheel adjustment is associated with the steering wheel adjustment device 4. The seat position control unit 6 and the steering wheel adjustment control unit 8 comprise hardware and software components for the function thereof in the present exemplary embodiment.

The seat position adjustment device 3 and the steering wheel adjustment device 4 each comprise positioning motors, with which the vehicle seat 5 or the steering wheel 7 can be automatically brought into predetermined positions. In this case, adjustable non-person-specific positions for the vehicle seat 5 or the steering wheel 7 can be stored in the seat position control unit 6 and/or the steering wheel adjustment control unit 8. Besides this, defined predetermined positions of the vehicle seat 5 and/or of the steering wheel 7 are often also stored that are adopted on deactivation of the ignition in order to facilitate an occupant exiting and entering for example. The seat position control unit 6 and/or the steering wheel adjustment control unit 8 cause the seat position adjustment device 3 or the steering wheel adjustment device 4 to move to said defined predetermined position of the vehicle seat 5 or of the steering wheel 7 in the event of deactivation of the ignition.

Moreover, the motor vehicle 1 comprises an accident detection device that is implemented in the present exemplary embodiment by the airbag control module 9 of the motor vehicle 1.

A communications connection within the motor vehicle 1 connects the airbag control module 9 to the seat position control unit 6 and/or the steering wheel adjustment control unit 8. In the present exemplary embodiment, the communications connection comprises a CAN bus 12, to which, besides further units (not shown), both the seat position control unit 6, and also the steering wheel adjustment control unit 8 are connected, as well as lines 13, 14 that individually connect the airbag control module 9 to each of the seat position control unit 6 and the steering wheel adjustment control unit 8.

If the airbag control module 9 detects an accident of the motor vehicle, it outputs at least one accident signal to the communications connection. In the present exemplary embodiment, the airbag control module 9 outputs a bus signal indicating an accident to the CAN bus 12 in order particularly to deactivate safety-relevant components of the motor vehicle, such as for example the fuel pump or the high voltage system of an electric vehicle. Within the context of the present exemplary embodiment, the bus signal is also received by the seat position control unit 6 and by the steering wheel adjustment control unit 8.

Furthermore, the airbag control module 9 outputs an ENS signal that passes via a line 13 to the seat position control unit 6 and via a further line 14 also to the steering wheel adjustment control unit 8 in the present exemplary embodiment.

Once the seat position control unit 6 receives the bus signal or the ENS signal, it deactivates the automatic seat position control. Likewise, the steering wheel adjustment control unit 8 deactivates the automatic steering wheel adjustment once it receives the bus signal or the ENS signal. A change of the seat position and/or the steering wheel adjustment by manually operating the control switch remains possible if the seat position control unit 6 and the seat position adjustment device 3, or the steering wheel adjustment control unit 8 and the steering wheel adjustment device 4 continue to be supplied with current. Rescue forces can then adjust the vehicle seat 5 and/or the steering wheel 7 if necessary by operating the control switches.

The accident detection device 9, the seat position control unit 6 and/or the steering wheel adjustment control unit 8 for automatic electrical steering wheel adjustment, as well as the communications connection within the motor vehicle 1 form the protective system within the scope of the present disclosure for protecting occupants of the motor vehicle 1 following a traffic accident against consequential injuries by an automatic electrical seat position adjustment and/or an automatic electrical steering wheel adjustment. As the seat position control unit 6 and the steering wheel adjustment control unit 8 can both receive the bus signal via the CAN bus 12, and also the ENS signal via the lines 13, 14, there is a redundancy that increases the operational safety of the protective system.

In addition, the automatic electrical seat position adjustment and/or the automatic electrical steering wheel adjustment is/are deactivated in the event of a lack of the CAN bus signal or of the ENS signal. This guarantees the continued safe and manual movement of the seat or of the steering wheel in the event of damage to the CAN lines or ENS lines by the traffic accident. Also, the automatic electrical movement of the seat 5 and/or the steering 7 is/are deactivated in the event of signals that cannot be identified by the control units 6 and 8.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for protecting occupants of a motor vehicle comprising:
    receiving an accident signal by a seat position control unit or a steering wheel adjustment control unit; and
    in response to the receiving, deactivating automated electrical seat position control by the seat position control unit or deactivating automated electrical steering wheel adjustment by the steering wheel adjustment control unit.

2. The method as claimed in claim 1, wherein the accident signal is sent via a bus that is connected to the seat position control unit and/or to the steering wheel adjustment control unit.

3. The method as claimed in claim 1, wherein an event notification signal (ENS) is sent as the accident signal via an individually associated line to the seat position control unit and/or to the steering wheel adjustment control unit.

4. The method as claimed in claim 3, wherein the seat position control unit deactivates the automated electrical seat position control in response to no signal received via the bus or the individually associated line, and/or the steering wheel adjustment control unit deactivates the automated electrical steering wheel adjustment in response to no signal received via the bus or the individually associated line.

5. The method as claimed in claim 1, further comprising one or more of:
    deactivating the automated electrical seat position control by the seat position control unit responsive to receiving unidentifiable signals by the seat position control unit; and
    deactivating the automated electrical steering wheel adjustment by steering wheel adjustment control unit responsive to receiving unidentifiable signals by the steering wheel adjustment control unit.

6. The method as claimed in claim 5 further comprising in response to the seat position control unit deactivating the automatic electrical seat position control or the steering wheel adjustment control unit deactivating the automatic electrical steering wheel adjustment, allowing a manual change of a present seat position and/or a present steering wheel adjustment.

7. A protective system for a vehicle comprising:
    a seat position control unit configured to control an automatic electrical seat;
    a steering wheel adjustment control unit configured to adjust an automatic electrical steering wheel;
    an accident detection device configured to detect a traffic accident; and
    a communications connection that connects the accident detection device to the seat position control unit and the steering wheel adjustment control unit,
    wherein the accident detection device is configured to output at least one accident signal to the communications connection, and the seat position control unit and the steering wheel adjustment control unit are configured to deactivate the automatic electrical seat and the steering wheel adjustment in response to receipt of the accident signal.

8. The protective system as claimed in claim 7, wherein the communications connection comprises a bus.

9. The protective system as claimed in claim 7, wherein the communications connection includes an individually associated line to each of the seat position control unit and the steering wheel adjustment control unit.

10. The protective system as claimed in claim 7, wherein the accident signal is sent via a bus that is connected to the seat position control unit and to the steering wheel adjustment control unit.

11. The protective system as claimed in claim 7, wherein the seat position control unit is configured to deactivate in response to unidentifiable signals, and the steering wheel adjustment control unit configured to deactivate in response to unidentifiable signals.

12. The protective system as claimed in claim 11, wherein a manual change of a present seat position and a present steering wheel adjustment remains possible in response to the seat position control unit deactivating and the steering wheel adjustment control unit deactivating.

13. A vehicle comprising:
    seat and steering wheel control units configured to control a seat and steering wheel, respectively; and
    a device configured to output a signal indicative of a traffic accident via a communications connection to each of the seat and steering wheel control units, wherein each of the seat and steering wheel control units deactivate in response to the signal.

14. The vehicle as claimed in claim 13, wherein the communication connection includes a bus.

15. The vehicle as claimed in claim 13, wherein the signal is an event notification signal (ENS) sent via an individually associated line of the communication connection to each of the seat and steering wheel control units.

16. The vehicle as claimed in claim 13, wherein the communications connection includes a bus that is connected to each of the seat and steering wheel control units.

17. The vehicle as claimed in claim 13, wherein each of the seat and steering wheel control units deactivate in response to unidentifiable signals.

18. The vehicle as claimed in claim 13 further comprising manual switches associated with each of the seat and steering wheel such that manual manipulation of a seat position and a steering wheel adjustment remain possible in response to each of the seat and steering wheel control units deactivating.

* * * * *